US012737116B1

(12) United States Patent
Kazi et al.

(10) Patent No.: US 12,737,116 B1
(45) Date of Patent: Sep. 15, 2026

(54) NAMESPACE RANGE-BASED MEMORY DEVICE COMPACTION

(71) Applicant: International Business Machines Corporation, Armonk, NY (US)

(72) Inventors: Asimuddin Kazi, Naperville, IL (US); Patrick Aaron Tamborski, Chicago, IL (US); Parker Swanson, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 19/078,385

(22) Filed: Mar. 13, 2025

(51) Int. Cl.
*G06F 3/06* (2006.01)

(52) U.S. Cl.
CPC .......... *G06F 3/0608* (2013.01); *G06F 3/0659* (2013.01); *G06F 3/0683* (2013.01)

(58) Field of Classification Search
CPC ..... G06F 3/0608; G06F 3/0659; G06F 3/0683
USPC .......................................................... 711/154
See application file for complete search history.

(56) References Cited

U.S. PATENT DOCUMENTS 5,761,411 A 6/1998 Teague et al.
7,584,219 B2 9/2009 Zybura et al.
7,987,167 B1 7/2011 Kazar et al.
8,108,483 B2 1/2012 Aust et al.
8,151,352 B1 4/2012 Novitchi
8,447,780 B1 5/2013 Plantenberg et al.
9,142,322 B2 9/2015 Baranwal et al.
9,171,160 B2 10/2015 Vincent et al.
9,535,774 B2 1/2017 Cher et al.
9,686,293 B2 6/2017 Golshan et al.
10,275,361 B2 4/2019 Ish et al.
10,884,648 B2 1/2021 Guo et al.
10,891,068 B2 1/2021 Guo et al.
11,226,860 B1 1/2022 Baptist et al.
11,314,442 B2 4/2022 Kazi et al.
11,412,041 B2 8/2022 Tamborski et al.
11,588,892 B1 2/2023 Khadiwala et al.
(Continued)

OTHER PUBLICATIONS

United States Non-Final Rejection dated Feb. 9, 2026, 45 pages, in U.S. Appl. No. 18/938,502.
(Continued)

*Primary Examiner* — Than Nguyen
(74) *Attorney, Agent, or Firm* — CANTOR COLBURN LLP; Stephen Yoder

(57) ABSTRACT

A method includes receiving, at a management device from a first storage device, a first indication of compaction being performed on one or more drives of the first storage device of a plurality of storage devices. The first indication of compaction includes a drive identifier for the one or more drives and namespace range information associated with the one or more drives that are performing compaction. The compaction is triggered based on the namespace range information. The method further includes selecting drives for a second storage device that can perform compaction such that a namespace range is covered by enough non-compacting drives on the second storage device to service an input/output request without using the drives of the first storage device performing compaction. The method further includes transmitting, by the management device, a second indication of the selected drives to the second storage device.

20 Claims, 7 Drawing Sheets

(56) References Cited

U.S. PATENT DOCUMENTS

| | | | |
|---|---|---|---|
| 11,973,823 | B1 | 4/2024 | Ghorpade et al. |
| 2007/0006048 | A1 | 1/2007 | Zimmer et al. |
| 2011/0145838 | A1 | 6/2011 | De et al. |
| 2013/0326284 | A1 | 12/2013 | Losh et al. |
| 2014/0032962 | A1 | 1/2014 | Deshpande |
| 2015/0074469 | A1 | 3/2015 | Cher et al. |
| 2015/0127919 | A1 | 5/2015 | Baldwin et al. |
| 2015/0243373 | A1 | 8/2015 | Chun et al. |
| 2016/0019983 | A1 | 1/2016 | Chung |
| 2016/0072889 | A1 | 3/2016 | Jung et al. |
| 2017/0004309 | A1 | 1/2017 | Pavlyushchik et al. |
| 2017/0031959 | A1* | 2/2017 | Zayas ................ G06F 16/1727 |
| 2017/0090824 | A1 | 3/2017 | Tamborski |
| 2017/0093978 | A1 | 3/2017 | Cilfone et al. |
| 2018/0025025 | A1 | 1/2018 | Davis et al. |
| 2018/0239697 | A1* | 8/2018 | Huang ................ G06F 12/0246 |
| 2018/0314441 | A1 | 11/2018 | Suryanarayana et al. |
| 2019/0065524 | A1 | 2/2019 | Johnson et al. |
| 2019/0146675 | A1 | 5/2019 | Subramanian et al. |
| 2019/0146907 | A1 | 5/2019 | Frolikov |
| 2019/0188589 | A1 | 6/2019 | Ponnuru et al. |
| 2019/0278498 | A1 | 9/2019 | Dedrick |
| 2019/0281114 | A1 | 9/2019 | Cocagne |
| 2019/0394272 | A1 | 12/2019 | Tamborski et al. |
| 2020/0019447 | A1 | 1/2020 | Tamborski et al. |
| 2020/0050365 | A1 | 2/2020 | Tamborski et al. |
| 2020/0104056 | A1 | 4/2020 | Benisty et al. |
| 2020/0183840 | A1 | 6/2020 | Johns et al. |
| 2020/0192799 | A1 | 6/2020 | Johns et al. |
| 2020/0278896 | A1 | 9/2020 | Kumari et al. |
| 2020/0409559 | A1 | 12/2020 | Sharon et al. |
| 2021/0173582 | A1 | 6/2021 | Kazi et al. |
| 2021/0216227 | A1 | 7/2021 | Kazi et al. |
| 2021/0349782 | A1 | 11/2021 | Ki et al. |
| 2021/0367834 | A1 | 11/2021 | Palavalli et al. |
| 2022/0236916 | A1 | 7/2022 | Esaka et al. |
| 2023/0195577 | A1 | 6/2023 | Darnell et al. |
| 2023/0401120 | A1 | 12/2023 | Gim et al. |
| 2024/0220227 | A1 | 7/2024 | Kerr et al. |
| 2024/0361939 | A1 | 10/2024 | Brown et al. |
| 2024/0377948 | A1* | 11/2024 | Zhang .................. G06F 3/0608 |
| 2025/0077475 | A1* | 3/2025 | Qi ........................ G06F 3/0679 |

OTHER PUBLICATIONS

United States Non-Final Rejection dated Oct. 2, 2025, 38 pages, in U.S. Appl. No. 18/938,516.

United States Non-Final Rejection dated Dec. 17, 2025, 33 pages, in U.S. Appl. No. 18/938,511.

United States Notice of Allowance dated Mar. 10, 2026, 17 pages, in U.S. Appl. No. 18/938,511.

"Intel® Optane™ DC SSD Series", Intel, Feb. 2012, 27 pages, https://ark.intel.com/content/www/us/en/ark/products/series/213706/intel-optane-dc-ssd-series.html.

"Intel® Solid-State Drive 520 Series", Intel, Sep. 9, 2024, 5 pages, https://www.intel.com/content/dam/www/public/us/en/documents/product-specifications/ssd-520-specification.pdf.

"SMART Attribute Details", Kingston, 2015, 9 pages, https://media.kingston.com/support/downloads/MKP_306_SMART_attribute.pdf.

"SSD Failures: Common Causes and Main Bad Symptoms", Multi-cloud backup Solutions, Oct. 27, 2020, 9 pages, https://www.salvagedata.com/ssd-failures-common-causes-and-main-symptom/.

"Tabular Classification", Hugging Face, retrieved from web https://huggingface.co/tasks/tabular-classification, dated Dec. 20, 2024, 4 pages.

"What is supervised learning?", IBM, retrieved from web https://www.ibm.com/think/topics/supervised-learning, dated Dec. 20, 2024, 9 pages.

Authors et. al.: Disclosed Without Attribution, IP.com No. IPCOM000252417D, "Method and System for Classifying Memory Devices and Slices to Create Optimal Storage Decisions in Distributed Storage Network (DSN)", Jan. 9, 2018, 3 pages.

Authors et. al.: Disclosed Without Attribution, IP.com No. IPCOM000263306D, "Dispersed Storage Namespace Health Based Device Prioritization and Recovery Algorithm", Aug. 17, 2020, 7 pages.

Authors et. al.: Disclosed Without Attribution, IP.com No. IPCOM000263385D, "Methodology of Hinting the NVME Host about the NVME Queues Optimized for NVME Namespace Operation", Aug. 26, 2020, 7 pages.

Authors et. al.: Seagate Technology, LLC, IP.com No. IPCOM000268073D, "Staged NVMe in a Primary/Secondary Relationship", Dec. 21, 2021, 4 pages.

Diamantopoulos et al. "WannaLaugh: A Configurable Ransomware Emulator—Learning to Mimic Malicious Storage Traces", arXiv:2403.07540v2 [cs.CR], Jun. 12, 2024, 22 pages, https://arxiv.org/abs/2403.07540v1#.

Gagulic et al. "Ransomware Detection with Machine Learning in Storage Systems", University of Zurich Department of Informatics (IFI) Binzmühlestrasse 14, CH-8050 Zurich, Switzerland, Feb. 13, 2023, 114 pages, https://files.ifi.uzh.ch/CSG/staff/vonderassen/extern/theses/map-gagulic-zumtaugwald-sahu.pdf.

Han et al. "ZNS+: Advanced Zoned Namespace Interface for Supporting In-Storage Zone Compaction", Proceedings of the 15th USENIX Symposium on Operating Systems Design and Implementation, Jul. 14-16, 2021, 17 pages.

Kazi, et al. "Proactive Operating System Memory Unit Replacement Based on Namespace Health," U.S. Appl. No. 18/938,516, filed Nov. 6, 2024, 24 pages.

Kazi, et al. "Upgrade Orchestration of a Storage System Based on Namespace Range Gaps," U.S. Appl. No. 18/938,502, filed Nov. 6, 2024, 40 pages.

Kruegel Christopher. "Full System Emulation: Achieving Successful Automated Dynamic Analysis of Evasive Malware", Lastline, 2014, 7 pages.

Lucia Theo. "An Ultimate Guide to Hard Drive Problems, Solutions and Tips", The Wayback Machine, Jan. 13, 2021, 21 pages, https://web.archive.org/web/20210122072236/https://recoverit.wondershare.com/computer-problem/common-hard-drive-problems-and-solution.html.

Min et al. "eZNS: Elastic Zoned Namespace for Enhanced Performance Isolation and Device Utilization", ACM Transactions on Storage, Jun. 6, 2024, pp. 1-41, vol. 20, Issue 3.

Rout Sidhartha Sankar. "Reliability Aware Intelligent Memory Management (RAIMM)", Indraprastha Institute of Information Technology Delhi, New Delhi, 2014, 54 pages, https://repository.iiitd.edu.in/jspui/handle/123456789/146.

Sharma Natasha. "K-Means Clustering Explained", Neptune Blog, Apr. 15, 2024, 25 pages.

Sharma Pulkit. "An Introduction to K-Means Clustering", Machine Learning, Dec. 18, 2024, 43 pages.

Tamborski, et al. "Identifying and Visualizing Namespace Range Gaps," U.S. Appl. No. 18/938,511, filed Nov. 6, 2024, 41 pages.

Tamborski, et al. "Processing Namespace Range Information by a Global Coordinator," U.S. Appl. No. 18/938,523, filed Nov. 6, 2024, 27 pages.

Taylor et al. "Sensor-based Ransomware Detection", Future Technologies Conference (FTC), Nov. 29-30, 2017, 8 pages, https://s2.smu.edu/~mitch/ftp_dir/pubs/ftc17.pdf.

Wang David. "Application Optimization with Flexible Zone Namespace Configurations in QLC-Based SSDs", Silicon Motion, 2023, 16 pages.

Wijaya Cornellius Yudha. "LLMs Implementation for Tabular Classifications", Trying out ML Tabular Classification Task with LLM, Nov. 16, 2023, 9 pages.

Zhang et al. "Towards Foundation Models for Learning on Tabular Data", arXiv:2310.07338 [cs.LG], Oct. 11, 2023, 22 pages.

Rahi Rohit, "Object Storage", Oct. 2019, 18 pages, https://www.oracle.com/a/ocom/docs/cloud/object-storage-100.pdf.

SNIA, "The SNIA Dictionary", Mar. 2022, 02 pages, https://www.snia.org/sites/default/files/dictionary/SNIADictionary.pdf.

(56) References Cited

OTHER PUBLICATIONS

United States Non- Final Rejection dated Oct. 27, 2025, 15 pages in U.S. Appl. No. 18/938,523.

* cited by examiner

NAMESPACE RANGE-BASED MEMORY DEVICE COMPACTION

BACKGROUND

The present disclosure relates to computing environments, and more specifically, to namespace range-based memory device compaction.

Computing devices communicate data, process data, and/or store data. Such computing devices range from wireless smart phones, laptops, tablets, personal computers (PC), workstations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

A computing device may effectively extend its CPU by using "cloud computing" to perform one or more computing functions (e.g., a service, an application, an algorithm, an arithmetic logic function, etc.) on behalf of the computing device. Further, for large services, applications, and/or functions, cloud computing may be performed by multiple cloud computing resources in a distributed manner to improve the response time for completion of the service, application, and/or function. For example, Hadoop is an open-source software framework that supports distributed applications, enabling application execution by hundreds or thousands of computers.

In addition to cloud computing, a computing device may use "cloud storage" as part of its memory system. Cloud storage enables a user, via its computing device, to store files, applications, etc., on an Internet-based storage system. The Internet-based storage system may include a RAID (redundant array of independent disks) system and/or a dispersed storage system that uses an error correction scheme to encode data for storage.

SUMMARY

According to an embodiment, a computer-implemented method for namespace range-based memory device compaction is provided. The method includes receiving, at a management device from a first storage device, a first indication of compaction being performed on one or more drives of the first storage device of a plurality of storage devices. The first indication of compaction includes a drive identifier for the one or more drives and namespace range information associated with the one or more drives that are performing compaction. The compaction is triggered based on the namespace range information. The method further includes selecting drives for a second storage device that can perform compaction such that a namespace range is covered by enough non-compacting drives on the second storage device to service an input/output request without using the drives of the first storage device performing compaction. The method further includes transmitting, by the management device, a second indication of the selected drives to the second storage device. The second storage device enables compaction to be performed on drives other than the selected drives.

Other embodiments described herein implement features of the above-described method in computer systems and computer program products.

The above features and advantages, and other features and advantages, of the disclosure are readily apparent from the following detailed description when taken in connection with the accompanying drawings.

BRIEF DESCRIPTION OF THE DRAWINGS

The specifics of the exclusive rights described herein are particularly pointed out and distinctly claimed in the claims at the conclusion of the specification. The foregoing and other features and advantages of one or more embodiments described herein are apparent from the following detailed description taken in conjunction with the accompanying drawings in which:

DETAILED DESCRIPTION

Figure 1:
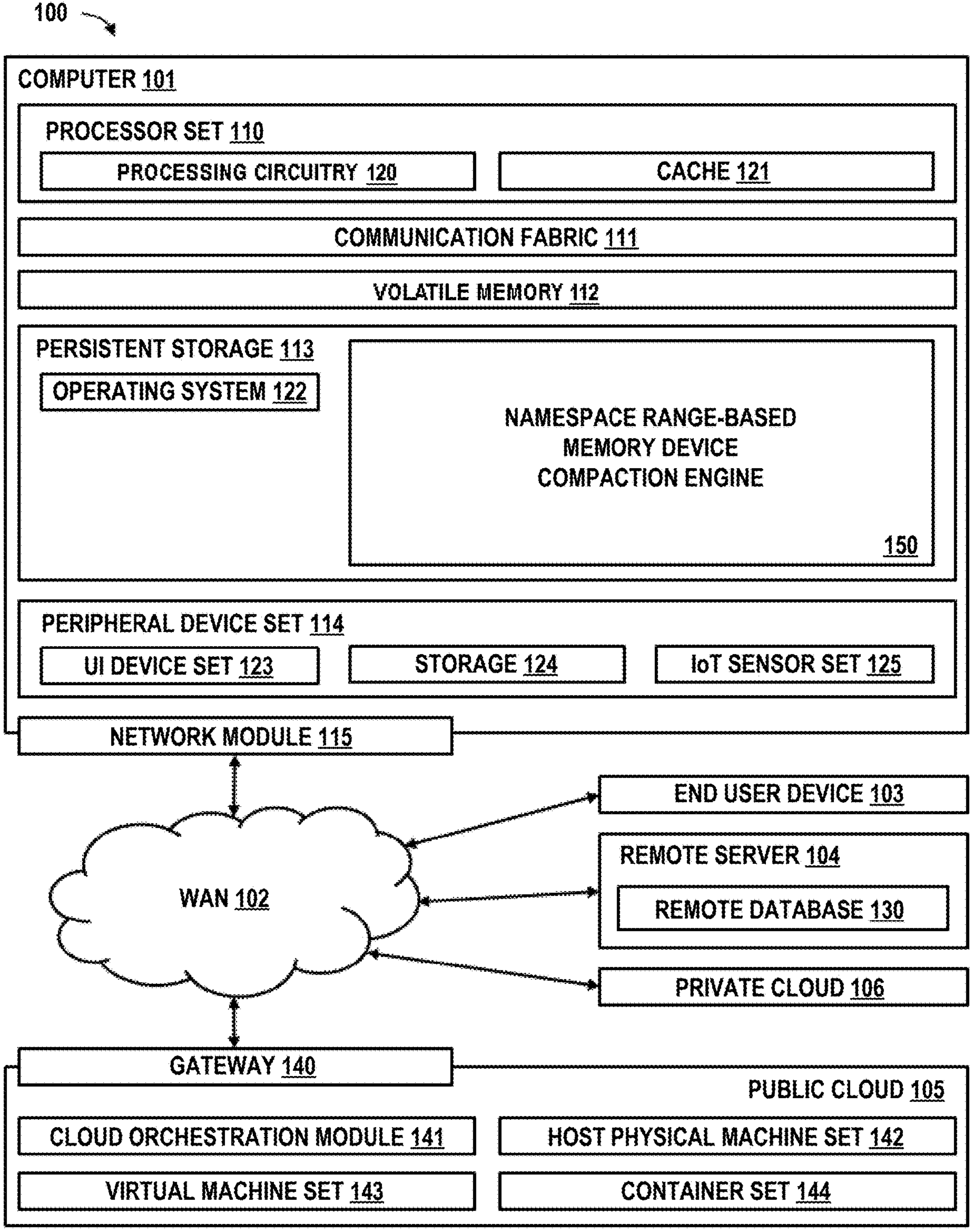
FIG. 1 illustrates a block diagram of a computing environment according to an embodiment.

One or more embodiments described herein provide for namespace range-based memory device compaction.

Storage systems refer to the various methods and technologies used to save, manage, and retrieve data. They encompass a range of solutions, from traditional hard disk drives (HDDs) and solid-state drives (SSDs) to advanced cloud-based and network-attached storage (NAS) systems. These systems are useful for both individuals and organizations to securely store and access data efficiently. Storage systems can be classified into primary storage, which includes high-speed devices for quick access, and secondary storage, which provides larger capacity and longer-term data retention. Advanced storage solutions also utilize technologies like RAID configurations, distributed storage, and object storage, which enhance data redundancy, reliability, and scalability. Modern systems often integrate with cloud infrastructure, providing versatile options for backup, disaster recovery, and data synchronization across multiple locations.

In a storage system, a namespace provides a structured way to organize and manage data by assigning a unique identifier to each data element or object. This allows for easy retrieval and categorization, similar to how file paths work in a filesystem. A namespace ensures that data within the system can be accessed without ambiguity, as each item has a distinct identifier. In distributed and cloud storage systems, namespaces are useful for managing data across multiple storage nodes and locations, enabling seamless scaling and access control. By abstracting data storage from physical devices, namespaces also facilitate features, such as data deduplication, versioning, and metadata management, making it easier to implement policies for data lifecycle, security, and compliance.

Descriptions of various embodiments of the present disclosure are presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 illustrates a computing environment 100, according to an embodiment. Computing environment 100 contains an example of an environment for the execution of at least some of the computer code involved in performing the inventive methods, such as a namespace range-based memory device compaction engine 150 for managing namespace range-based memory device compaction. In addition to the namespace range-based memory device compaction engine 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and the namespace range-based memory device compaction engine 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in the namespace range-based memory device compaction engine 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like.

Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in the namespace range-based memory device compaction engine 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105.

The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
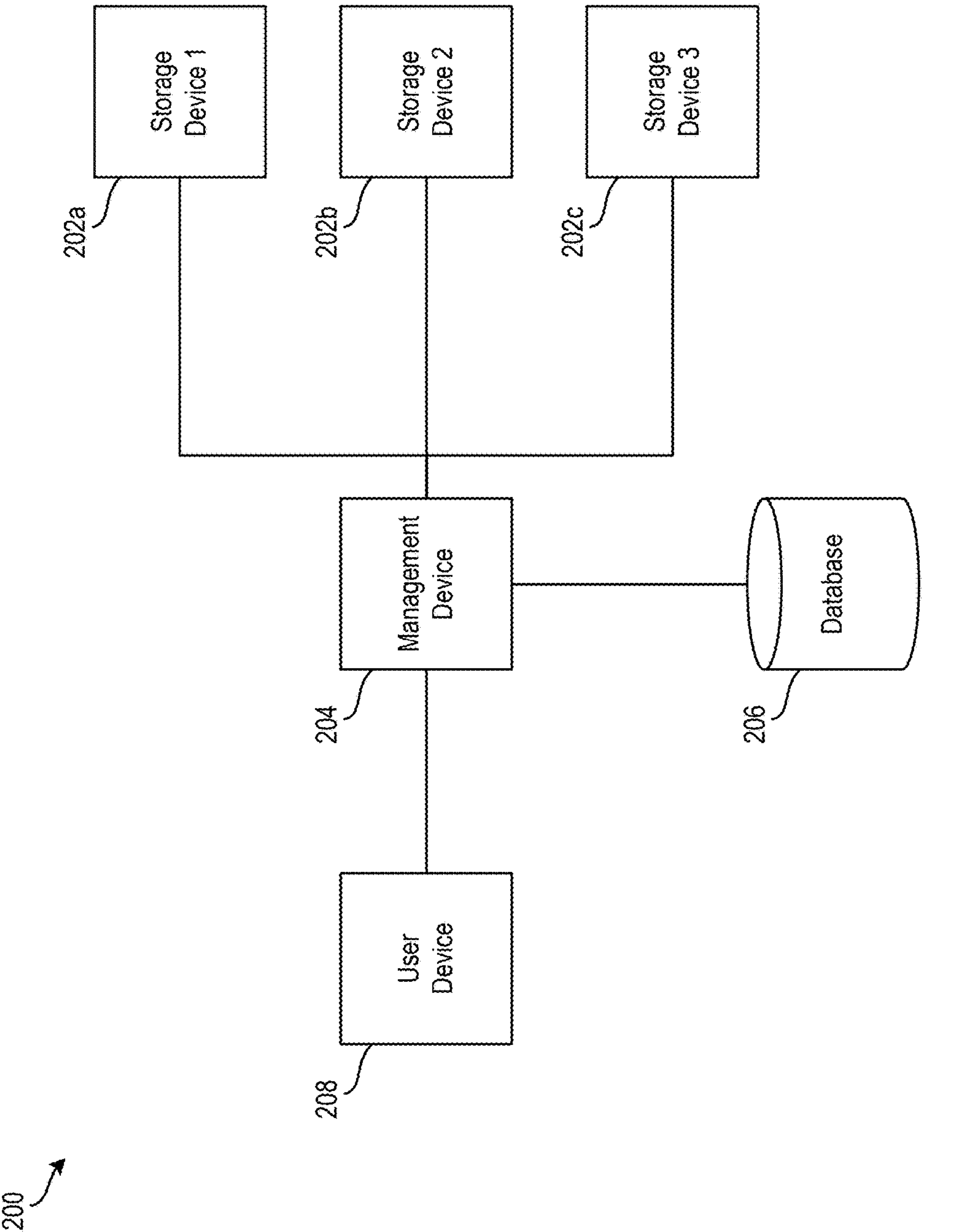
FIG. 2 schematically illustrates a block diagram of a storage system for namespace range-based memory device compaction according to an embodiment.

FIG. 2 illustrates a block diagram of a storage system 200 for namespace range-based memory device compaction according to an embodiment. The storage system 200 is an example of a data storage network (DSN). The storage system 200 can be implemented by any suitable computing system, device, or environment, such as those described herein. The storage system 200 includes multiple storage devices, including storage device 1 202*a*, storage device 2 202*b*, and storage device 3 202*c* (collectively referred to as "storage devices 202" and also referred to as "storage units" and/or "memory devices"). Although three storage devices are shown, other numbers (e.g., fewer or greater) of storage devices can be implemented in other embodiments. The storage devices 202 are communicatively connected to a management device 204 for managing aspects of the storage devices 202. The storage devices 202 can include one or more drives (as shown in FIGS. 5B and 5C, for example), which are used to store data.

The storage devices 202 are designed to accommodate multiple namespace ranges, which significantly enhances their flexibility and utility in managing data. A namespace range refers to a structured segment of the storage system 200 that assigns unique identifiers to data elements, facilitating efficient data organization and retrieval. By supporting multiple namespace ranges, these storage devices can handle diverse data sets and applications simultaneously, allowing for seamless scaling and improved access control. This capability is particularly beneficial in distributed and cloud storage environments, where data is often spread across various nodes and locations (e.g., the multiple storage devices 202). The ability to manage multiple namespace ranges ensures that the storage system 200 can efficiently handle large volumes of data while maintaining high performance and reliability. This feature also supports advanced storage functionalities, such as data deduplication, versioning, and metadata management, which are useful for implementing robust data lifecycle policies, security measures, and compliance protocols.

The management device 204 is also communicatively connected to a database 206, which stores information about the storage devices 202, such as information about namespace ranges, drive compaction, as well as other suitable information. The management device 204 can notify a user via user device 208 of any namespace range gaps and/or other suitable information, such as information about which drives are performing compaction. The user device 208 can be any suitable system or device, such as a laptop computer, desktop computer, virtual computer environment, smartphone, tablet computer, wearable computing device, and/or the like, including combinations and/or multiples thereof.

With continued reference to FIG. 2, the management device 204 oversees distributed data storage by setting parameters for the storage devices 202. Such parameters can be used for vault creation, storage, security, etc. The management device 204 coordinates the creation of a vault (e.g., a virtual memory block associated with a portion of an overall namespace of the storage devices 202) within the memory of the storage devices 202. The management device 204 generates a slice name (SN) for each of the encoded data slices of the storage devices 202. The slice name includes Pillar number of the encoded data slice, a data segment number, a vault identifier, which serves as a DSN address for storage and retrieval, and/or the like, including combinations and/or multiples thereof.

Data storage units (e.g., the storage devices 202) are assigned memory devices to store and retrieve slices, aiming to balance storage availability. The management device 204 assigns DSN address ranges to storage units (e.g., the storage devices 202) and generates resource assignment information, including dispersal parameters, storage unit identifiers, addressing details, and/or the like, including combinations and/or multiples thereof. This information is distributed to the storage devices 202 to initialize their use for storing encoded data slices. To recover data segments, a decode threshold number of encoded data slices is used to recover the data segment, and a write threshold number of encoded data slices is used for a successful write operation recovery. Each of the storage devices 202, with its processor and memory, provides resource availability information to the management device 204, receives resource assignment information, and selects memory devices for the new DSN memory based on this information.

One or more embodiments described herein provide for namespace range-based memory device compaction.

In modern computing environments, data storage systems, such as the storage system 200, play a role in managing the vast amounts of data generated and processed by various devices and applications. These storage systems often employ drives that require periodic maintenance processes, such as compaction, to optimize storage efficiency and ensure the availability of space for future input/output (I/O) operations. Compaction involves reorganizing data within storage devices to consolidate free space, which is useful for maintaining the performance and reliability of the storage system.

However, the compaction process presents several challenges. A significant issue is the competition for resources between compaction operations and client I/O requests. Since compaction involves reading and writing data to new sectors, this can lead to increased execution times for I/O operations on the drives undergoing compaction. This competition can result in higher latency, negatively impacting the overall performance of the storage system. In distributed storage systems, where data is spread across multiple drives, simultaneous compaction on drives representing the same namespace can exacerbate latency issues, as client I/O operations may need to rely on these compacting drives to succeed.

Existing solutions often employ a flat threshold for triggering compaction across all drives. Assuming that drives servicing the same namespace will fill up evenly and reach the compaction threshold simultaneously, this approach can lead to multiple drives compacting at the same time, further increasing latency and potentially causing service disruptions. Additionally, current approaches may not adequately address the need to balance compaction with client I/O demands, resulting in suboptimal performance (e.g., increased latency) and user experience.

One or more embodiments described herein addresses these challenges by providing for namespace range-based memory device compaction where namespace range information and/or information about gaps in the namespace range are used to manage compaction in a storage system. Gaps in namespaces can occur when data is assigned a name and the underlying storage mechanism responsible for the name is unreadable or unavailable. One or more embodiments strategically manages the compaction process to limit the client-facing latency effects. By utilizing namespace range information and selectively triggering compaction on specific drives across storage devices, one or more embodiments ensures that enough non-compacting drives are available to service I/O requests without relying on compacting drives, thereby avoiding increased latency. This strategy minimizes the impact of compaction on system-level latencies, allowing for efficient data management and improved performance in distributed storage environments.

According to one or more embodiments, the management device 204 implements a method that limits the effect compaction has on system-level latencies. One or more embodiments limits the number of drives on each storage device that are simultaneously performing compaction. A certain number of drives are selected for compaction from each storage device such that each namespace range is covered by enough non-compacting drives to service client I/O requests without work from the compacting drives. Hence the one or more embodiments assures that servicing client I/O requests continues without being impacted by compaction on the selected drives. The drives doing compaction would still see higher execution times, but there will be enough other drives from other storage devices in each namespace range that are not performing compaction to service client I/O requests without seeing increased latency.

Figure 3:
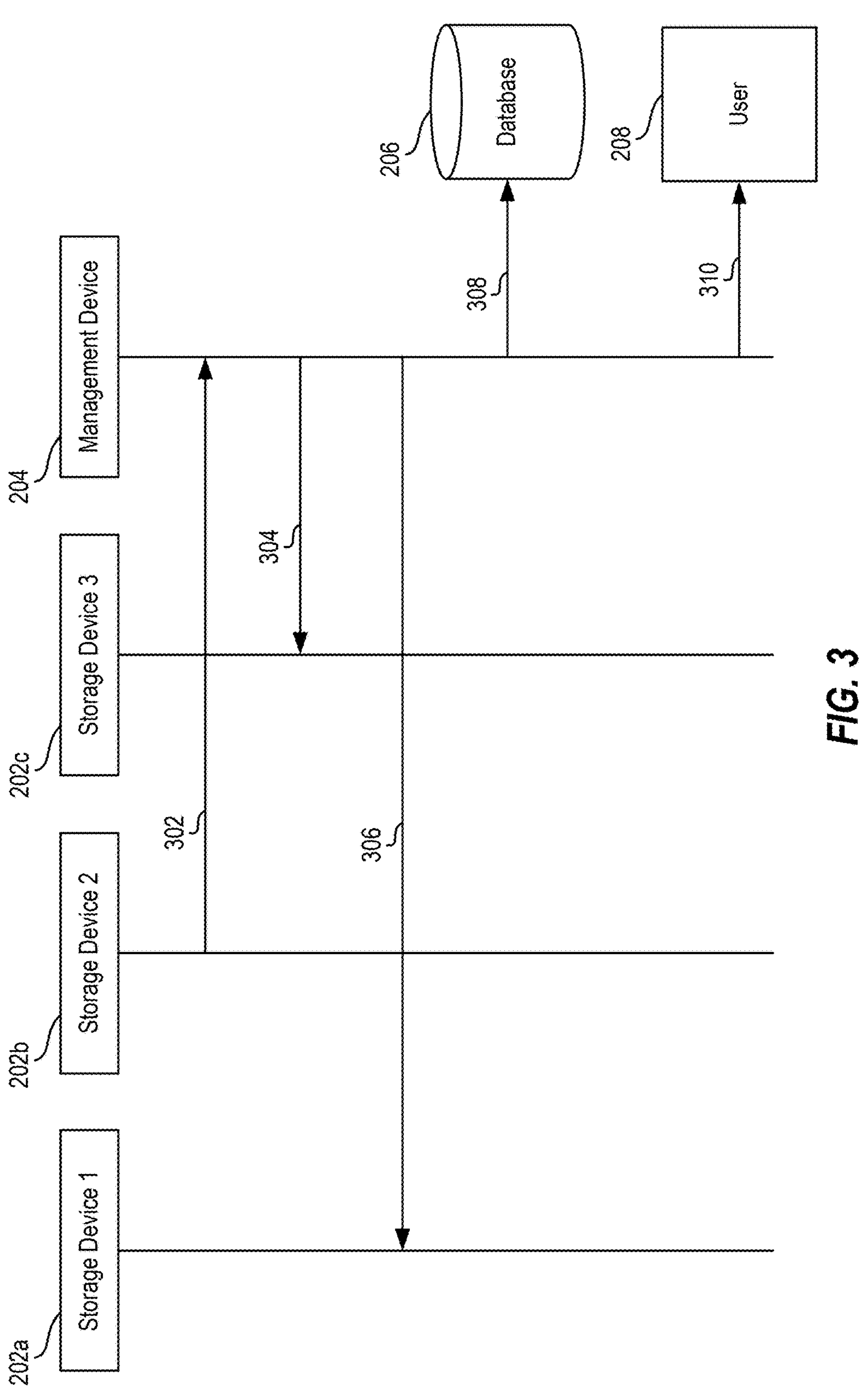
FIG. 3 illustrates a sequence diagram for namespace range-based memory device compaction according to an embodiment.

FIG. 3 illustrates a sequence diagram 300 for namespace range-based memory device compaction, according to an embodiment. In this example, the sequence diagram 300 illustrates how namespace range-based memory device compaction is performed in one or more of the storage devices 202, namely the storage device 1 202*a* and the storage device 2 202*b*, using the management device 204.

In this example, the storage device 2 202*b* initiates compaction on one or more of its drives. At action 302, the storage device 2 202*b* notifies the management device 204 about the compaction. Particularly, the storage device 2 202*b* indicates to the management device 204 which drives to which compaction is being performed, such as by drive number or other identifier, and namespace range information associated with the one or more drives that are performing compaction.

At action 304 and action 306, the management device 204 notifies the other storage devices, such as the storage device 1 202*a* and the storage device 3 202*c*, about the compaction being performed at the storage device 2 202*b*. Particularly, the management device 204 indicates to the other storage devices, namely the storage device 1 202*a* and the storage device 3 202*c*, which memory devices are performing compaction on the storage device 2 202*b*, including a drive number or other identifier, and namespace range information associated with the memory devices that are performing compaction on the storage device 2 202*b*.

At action 308, the management device 204 can store information about which memory devices are performing compaction on the storage device 2 202*b*, including a drive number or other identifier, and namespace range information associated with the memory devices that are performing compaction on the storage device 2 202*b* in the database 206. It should be appreciated that action 308 can be performed prior to, concurrently with, or subsequent to performing the action 304 and/or the action 306.

At action 310, the management device 204 generates (or causes to be generated) an alert or graphical representation to notify the user via the user device 208, of information about the compaction. For example, the alert or graphical representation can visually display information about which memory devices are performing compaction on the storage device 2 202*b*, including a drive number or other identifier, and namespace range information associated with the memory devices that are performing compaction on the storage device 2 202*b*. It should be appreciated that action 310 can be performed prior to, concurrently with, or subsequent to performing the action 304, the action 306, and/or the action 308.

Figure 4:
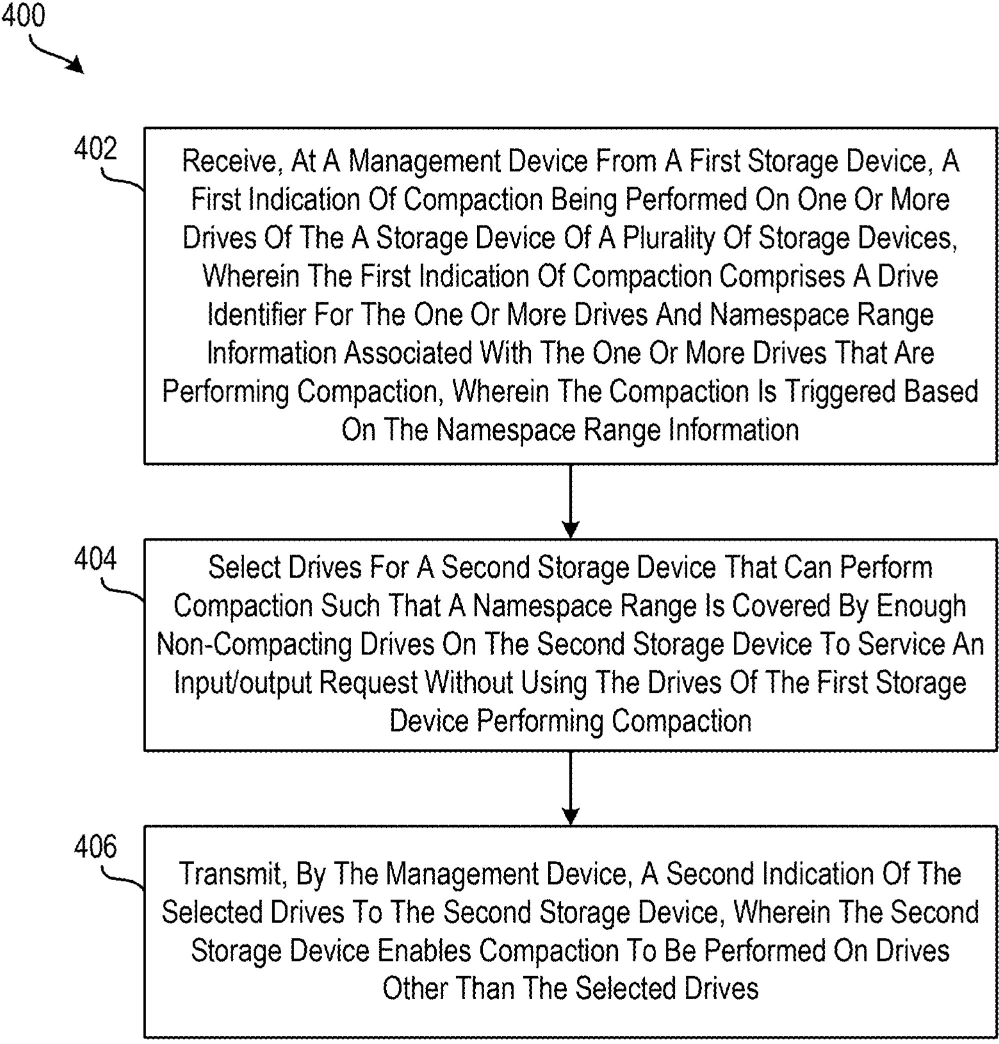
FIG. 4 illustrates a flow diagram of a method for namespace range-based memory device compaction according to an embodiment.

Turning now to FIG. 4, a flow diagram of a method 400 for namespace range-based memory device compaction is provided, according to an embodiment. The method 400 can be performed by any suitable computing system, device, or environment, such as those described herein. The method 400 is now described with reference to the computing environment 100, and particularly the namespace range-based memory device compaction engine 150, but is not so limited.

The method 400 provides for optimizing the process of storage device compaction by strategically managing the namespace ranges across multiple storage devices (e.g., the storage devices 202). The method 400 begins at operation 402, where the management device 204 receives an indication from a first storage device (e.g., the storage device 2 202*b*) that compaction is being performed on one or more of its drives. This indication includes a drive identifier for the drives undergoing compaction and namespace range information associated with the drives that are undergoing compaction. The compaction process is triggered based on the namespace range information, which helps in identifying the specific segments of data that are being reorganized.

At operation 404, the management device 204 selects drives for a second storage device (e.g., the storage device 3 202*c*) that can perform compaction. The selection is made such that the namespace range is adequately covered by enough non-compacting drives on the second storage device to avoid latency issues for client I/O requests (e.g., read requests, write requests). This ensures that the I/O requests can be serviced without relying on the compacting drives of the first storage device. For example, the management device 204 selects drives such that a number of drives performing compaction is limited to an adjustable maximum percentage (e.g., 10%) of drives in the first storage device and the second storage device across the namespace range. That is, having too many compacting drives across as single namespace is avoided. By strategically selecting which drives to compact, the method 400 aims to maintain the availability and performance of the storage system 200, thereby preventing any potential bottlenecks or increased latency that could affect client operations.

At operation 406, the management device 204 transmits an indication of the selected drives to the second storage device (e.g., the storage device 2 202*c*). This communication enables the second storage device to perform compaction on drives other than those selected, ensuring that the namespace range remains accessible and that client I/O operations are not disrupted. The second storage device can then enable compaction on drives such that the namespace remains available without causing latency issues for I/O requests.

Additional processes also may be included, and it should be understood that the processes depicted in FIG. 4 represent illustrations, and that other processes may be added or existing processes may be removed, modified, or rearranged without departing from the scope of the present disclosure. It should also be understood that the processes depicted in FIG. 4 may be implemented as programmatic instructions stored on a non-transitory computer-readable storage medium that, when executed by a processor (e.g., the processor set 110, the processing circuitry 120) of a computing system (e.g., the computer 101), cause the processor to perform the processes described herein.

Examples of representations depicting namespace range-based memory device compaction are shown in FIGS. 5A-5E and are now described in detail with reference to FIG. 2. In these examples, the following assumptions may be made, but merely to illustrate features of the embodiments described herein; such assumptions should not be considered limiting. Each storage device (e.g., the storage devices 202) includes 48 drives (although other numbers of drives may be used in other embodiments). Each of the drives have substantially the same capacity. The namespace range is substantially uniformly distributed on each drive. Ten percent (10%) of 48 drives is considered to be four (4) (rounded down).

If 8-wide information dispersal algorithm (IDA) across 8 memory devices (Single Stripe System) is used, where the number of memory devices is equal to IDA width, each memory device is responsible for exactly one Pillar of slices, and the set contains exactly one stripe. This configuration is shown in FIG. 5A.

Figure 5A:
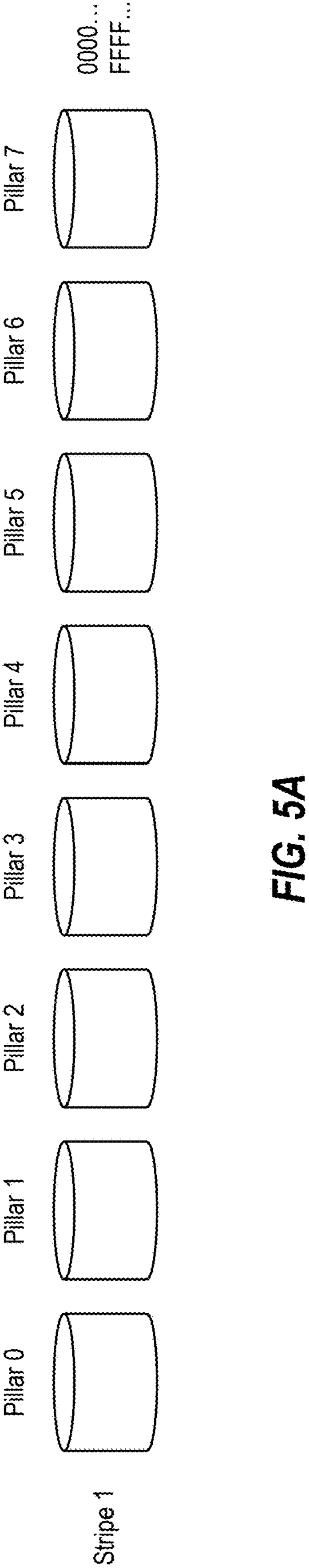
FIGS. 5A-5C schematically illustrate an example of namespace range-based memory device compaction according to an embodiment.
Figure 5B:
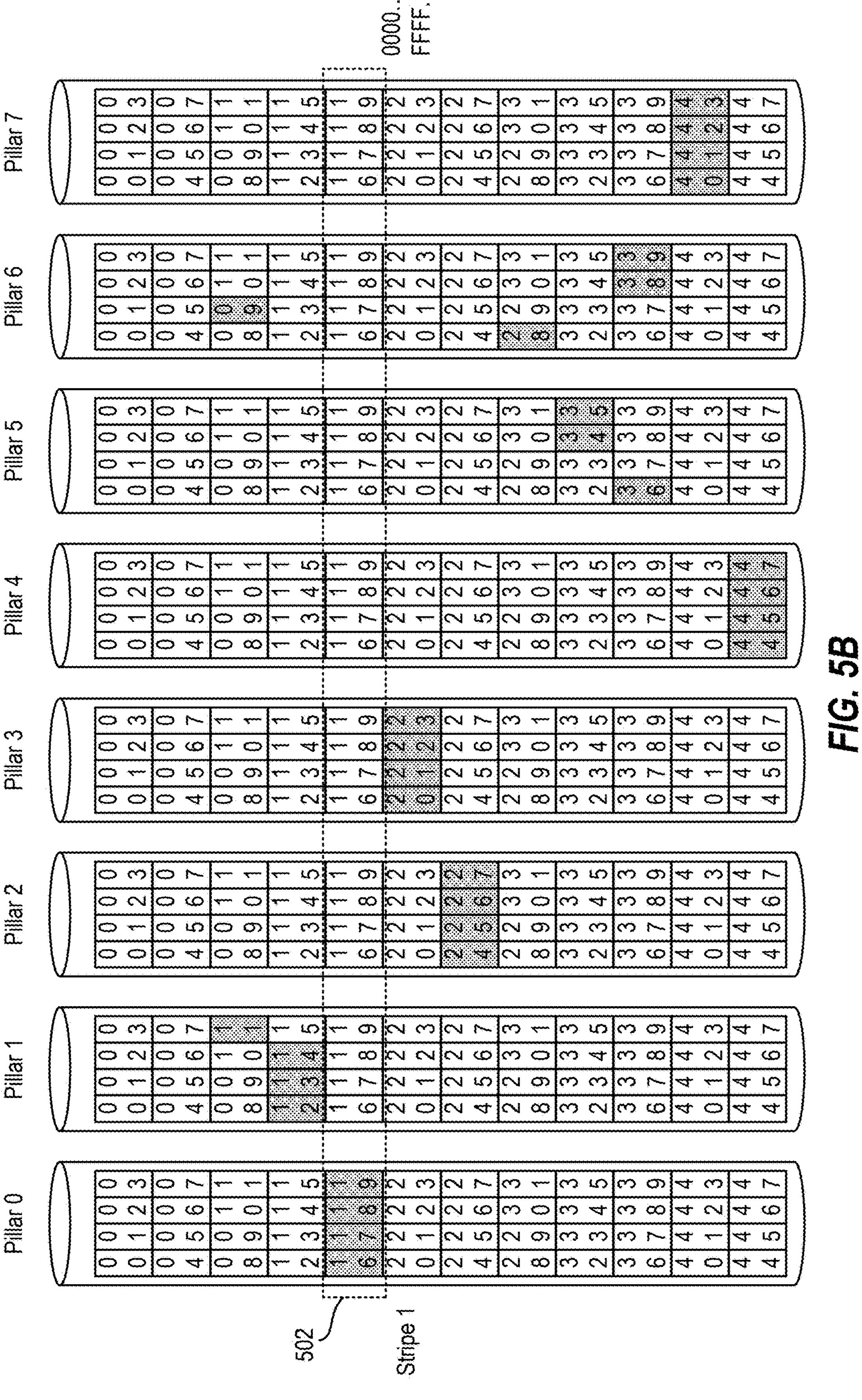
Figure 5C:
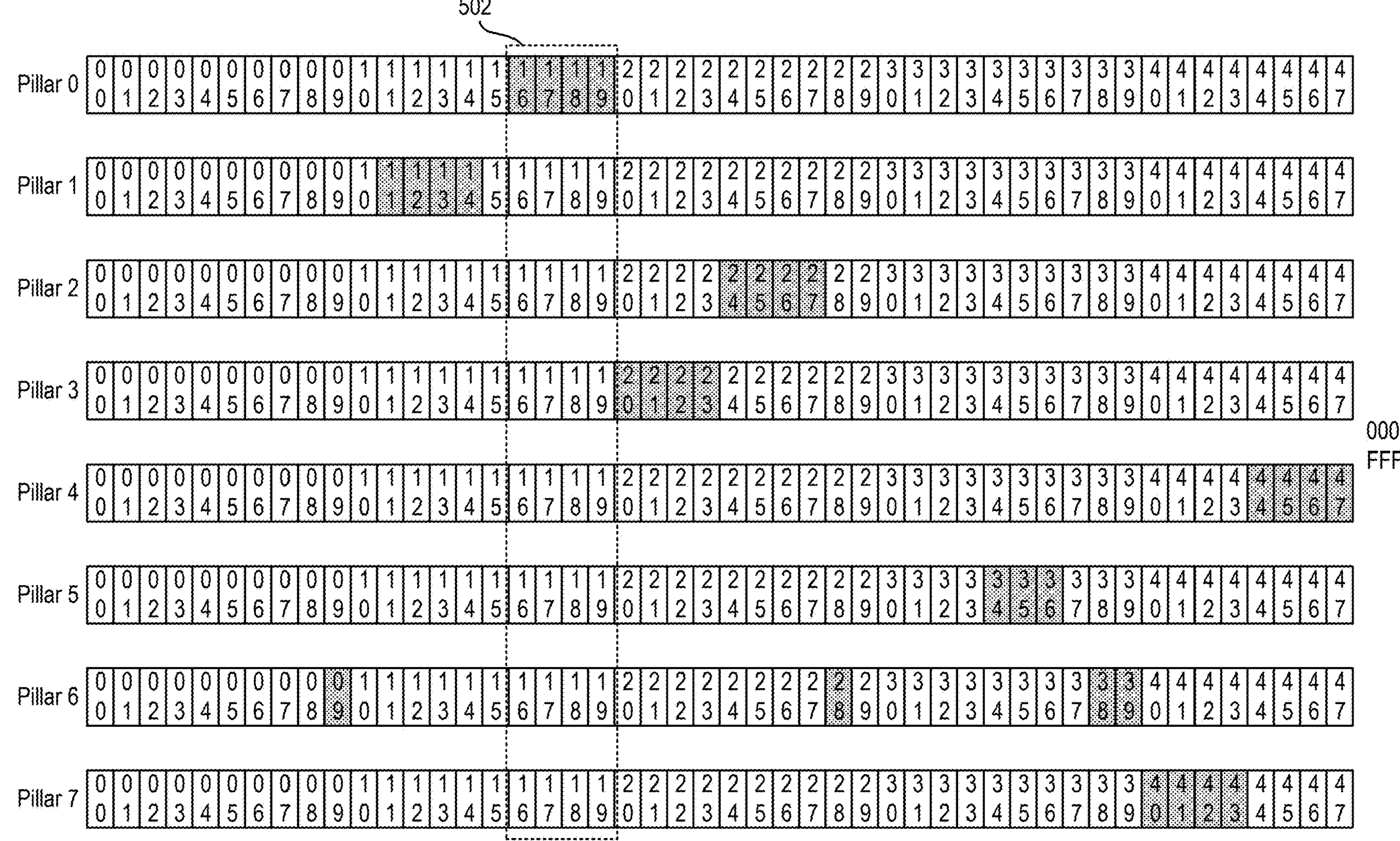

In particular, FIG. 5A shows a representation of Stripe 1, which includes multiple components referred to as Pillars, namely Pillar 0, Pillar 1, Pillar 2, Pillar 3, Pillar 4, Pillar 5, Pillar 6, and Pillar 7. The Pillars 0 through Pillar 7 represent different storage devices, for example. These components collectively form a part of the namespace structure within the storage system 200. Stripe 1 serves as a logical grouping of data segments distributed across the various Pillars. This organization facilitates efficient data management and retrieval within the storage system. Stripe 1 plays a role in maintaining data integrity and optimizing storage operations. The Pillars (e.g., Pillar 0-Pillar 7) serve as storage units that each store a portion of data associated with Stripe 1. As shown in FIGS. 5B-5D, each of the Pillars includes multiple drives (e.g., 48 drives), each numbered sequentially: 00, 01, 02, 03, . . . 46, 47, 48.

In this example, consider a storage pool with a vault with IDA of 8/5/7 (Width/Threshold/Write threshold) with 1 stripe (e.g., width of 8 memory devices across 8 memory devices). In this example, four drives from each memory device start compaction. In this example, the number of drives, namely four, is determined using an of drives performing compaction (e.g., 10%), where the number of drives is 10% of the number of drives in each Pillar (e.g., 48), rounded down (e.g., 10% of 48 drives rounded down). Other values for the adjustable maximum percentage of drives performing compaction are possible in other examples.

In FIGS. 5B and 5C, four drives on each Pillar 0 through Pillar 7 are performing compaction, as shown by the shaded boxes. It should be appreciated that other numbers of drives can be performing compaction in other embodiments depending on the adjustable maximum percentage of drives performing compaction. In this example, the first nine drives (e.g., drives 00-08) on each Pillar 0 through Pillar 7 are not doing any compaction, hence that part of the namespace range is not impacted by compaction. For this example, it is assumed that the namespace is common across all drives/Pillars (e.g., namespace across drives 16-19 is common from Pillar 0 through Pillar 7). However, the namespace may be allocated across different drives in different Pillars in other embodiments (e.g., drives 16-19 of Pillar 0 and drives 00-04 of Pillar 1 could share a namespace in another embodiment). As can be seen from box 502 in FIGS. 5B and 5C, the four drives performing compaction on Pillar 0, namely drives 16-19, are not performing compaction on any of the other Pillars, thus the namespace remains available for client I/O requests (e.g., read requests, write requests) because the adjustable maximum percentage (e.g., 10%) has not been exceeded. It should be appreciated that, while the maximum number of drives undergoing compaction in this example is four, some Pillars may have less than four drives undergoing compaction (e.g., Pillar 5). It should also be appreciated that the drives undergoing compaction on each Pillar may be sequential (e.g., Pillar 0 through Pillar 5, Pillar 7) or non-sequential (e.g., Pillar 6). As can be observed in FIGS. 5B and 5C, while the drives on each Pillar 0 through Pillar 7 where compaction is in progress, none of the namespace range is at the level where the storage system 200 is hitting read or write threshold so even though drives trigger latency at drive level it may not impact any namespace ranges. This approach does not result in any extra latency triggered by compaction.

According to one or more embodiments, storage devices 202 propagate metadata describing drives executing compaction as part of their tabulated view/state and send such information to the management device 204. The management device 204 extracts and records compaction metadata and identifies the namespace range information for each drive. The namespace range information for each drive is then assumed to be a “gap,” “degraded,” or “missing.”

One or more embodiments of the namespace range-based memory device compaction method offer several technical benefits that enhance the functioning of a computer system, particularly in distributed storage environments. For example, by strategically managing the compaction process based on namespace range information, one or more embodiments ensure that compaction is performed in a manner that minimizes disruption to client I/O operations (e.g., read requests, write requests). This targeted approach allows for the selection of specific drives for compaction while limiting the impact to namespace ranges, ensuring that enough non-compacting drives remain available to handle I/O requests efficiently. As a result, the storage system experiences reduced latency and improved responsiveness, even during periods of data reorganization.

Additionally, one or more embodiments enhances data management by supporting multiple namespace ranges, which facilitates efficient data organization and retrieval. This capability is particularly beneficial in environments where data is distributed across various nodes and locations, as it allows for seamless scaling and improved access control. By maintaining high performance and reliability, one or more embodiments supports advanced storage functionalities such as data deduplication, versioning, and metadata management. These features are useful for implementing robust data lifecycle policies, security measures, and compliance protocols.

Furthermore, one or more embodiments improve the overall efficiency of the storage system by optimizing the use of resources during compaction. By limiting the number of drives undergoing compaction at any given time, one or more embodiments reduces the competition for resources between compaction operations and client I/O requests. This careful management of resources not only enhances storage system performance but also contributes to the longevity and reliability of the storage devices. Overall, the technical benefits provided by these embodiments result in a more efficient, reliable, and scalable storage system, which is useful for modern computing environments that handle large volumes of data.

While the foregoing is directed to embodiments of the present disclosure, other and further embodiments of the present disclosure may be devised without departing from the basic scope thereof, and the scope thereof is determined by the claims that follow.

What is claimed is:

1. A computer-implemented method comprising:

receiving, at a management device from a first storage device, a first indication of compaction being performed on one or more drives of the first storage device of a plurality of storage devices, wherein the first indication of compaction comprises a drive identifier for the one or more drives and namespace range information associated with the one or more drives that are performing compaction, wherein the compaction is triggered based on the namespace range information;

selecting drives for a second storage device that can perform compaction such that a namespace range is covered by enough non-compacting drives on the second storage device to service an input/output request without using the drives of the first storage device performing compaction; and transmitting, by the management device, a second indication of the selected drives to the second storage device, wherein the second storage device enables compaction to be performed on drives other than the selected drives.

2. The computer-implemented method of claim 1, wherein the drive identifier comprises a drive number.

3. The computer-implemented method of claim 1, wherein the selecting the drives is performed based on a client latency demand.

4. The computer-implemented method of claim 1, further comprising storing information about the one or more drives that are performing compaction on the first storage device to a database.

5. The computer-implemented method of claim 1, further comprising generating an alert to indicate information about the one or more drives that are performing compaction on the first storage device.

6. The computer-implemented method of claim 1, wherein a number of drives performing compaction is limited to an adjustable maximum percentage of drives in the first storage device and the second storage device across the namespace range.

7. The computer-implemented method of claim 1, the first storage device and the second storage device are part of a cloud storage system.

8. A computer system comprising:

a processor set;

one or more computer-readable storage media; and program instructions stored on the one or more computer-readable storage media to cause the processor set to perform operations comprising:

receiving, at a management device from a first storage device, a first indication of compaction being performed on one or more drives of the first storage device of a plurality of storage devices, wherein the first indication of compaction comprises a drive identifier for the one or more drives and namespace range information associated with the one or more drives that are performing compaction, wherein the compaction is triggered based on the namespace range information;

selecting drives for a second storage device that can perform compaction such that a namespace range is covered by enough non-compacting drives on the second storage device to service an input/output request without using the drives of the first storage device performing compaction; and transmitting, by the management device, a second indication of the selected drives to the second storage device, wherein the second storage device enables compaction to be performed on drives other than the selected drives.

9. The computer system of claim 8, wherein the drive identifier comprises a drive number.

10. The computer system of claim 8, wherein the selecting the drives is performed based on a client latency demand.

11. The computer system of claim 8, the operations further comprising storing information about the one or more drives that are performing compaction on the first storage device to a database.

12. The computer system of claim 8, the operations further comprising generating an alert to indicate information about the one or more drives that are performing compaction on the first storage device.

13. The computer system of claim 8, wherein a number of drives performing compaction is limited to an adjustable maximum percentage of drives in the first storage device and the second storage device across the namespace range.

14. The computer system of claim 8, the first storage device and the second storage device are part of a cloud storage system.

15. A computer program product comprising:

one or more computer-readable storage media; and program instructions stored on the one or more computer-readable storage media to perform operations comprising:

receiving, at a management device from a first storage device, a first indication of compaction being performed on one or more drives of the first storage device of a plurality of storage devices, wherein the first indication of compaction comprises a drive identifier for the one or more drives and namespace range information associated with the one or more drives that are performing compaction, wherein the compaction is triggered based on the namespace range information;

selecting drives for a second storage device that can perform compaction such that a namespace range is covered by enough non-compacting drives on the second storage device to service an input/output request without using the drives of the first storage device performing compaction; and transmitting, by the management device, a second indication of the selected drives to the second storage device, wherein the second storage device enables compaction to be performed on drives other than the selected drives.

16. The computer program product of claim 15, wherein the drive identifier comprises a drive number.

17. The computer program product of claim 15, wherein the selecting the drives is performed based on a client latency demand.

18. The computer program product of claim 15, the operations further comprising storing information about the one or more drives that are performing compaction on the first storage device to a database.

19. The computer program product of claim 15, the operations further comprising generating an alert to indicate information about the one or more drives that are performing compaction on the first storage device.

20. The computer program product of claim 15, wherein a number of drives performing compaction is limited to an adjustable maximum percentage of drives in the first storage device and the second storage device across the namespace range.

* * * * *